May 28, 1940.   F. E. HARRELL ET AL   2,202,421
CONTROL SYSTEM
Filed Nov. 10, 1938    3 Sheets-Sheet 1
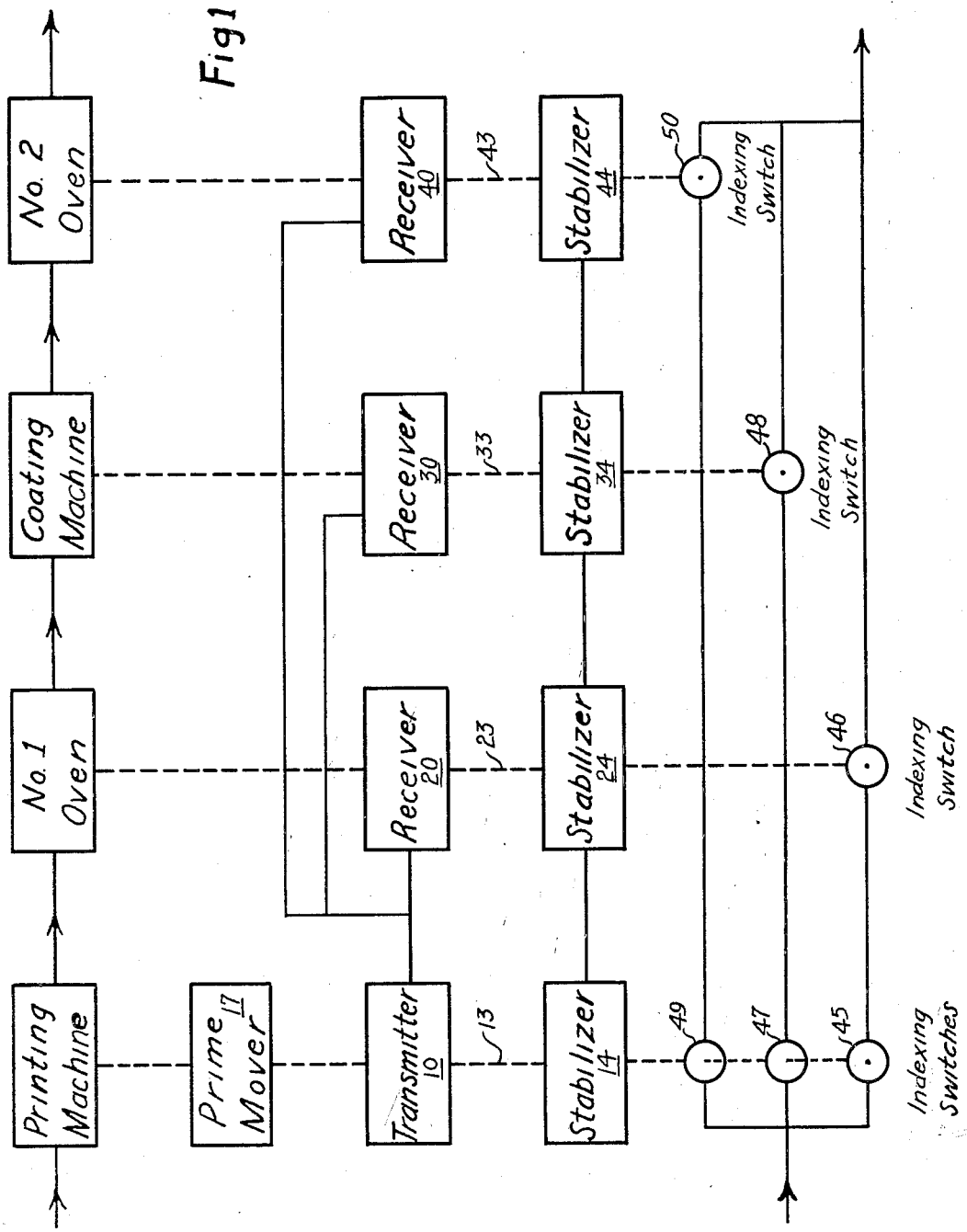
INVENTOR.
Fred E. Harrell
Richard A. Geuder
BY Hoodling and Krost
ATTORNEY.

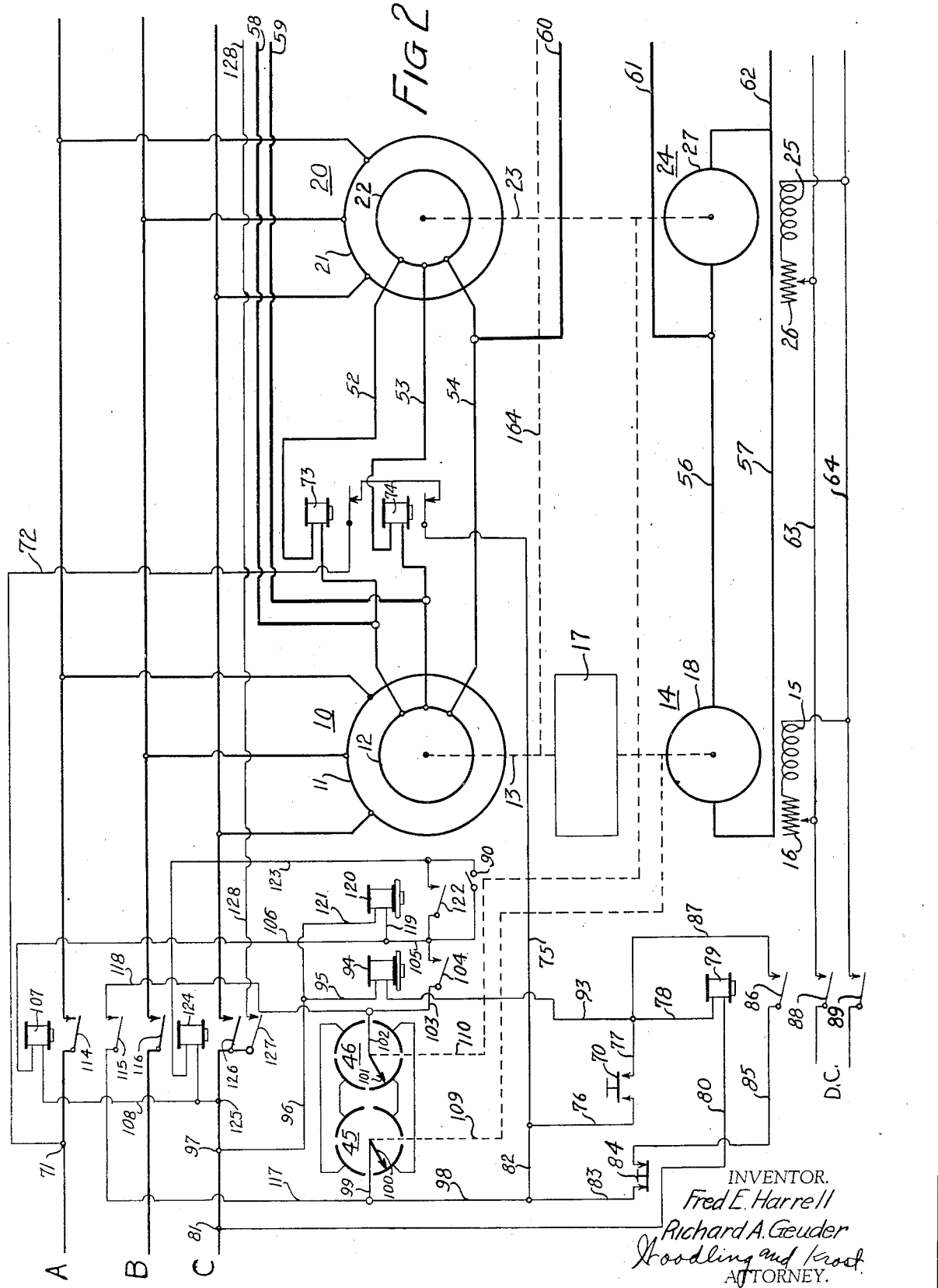

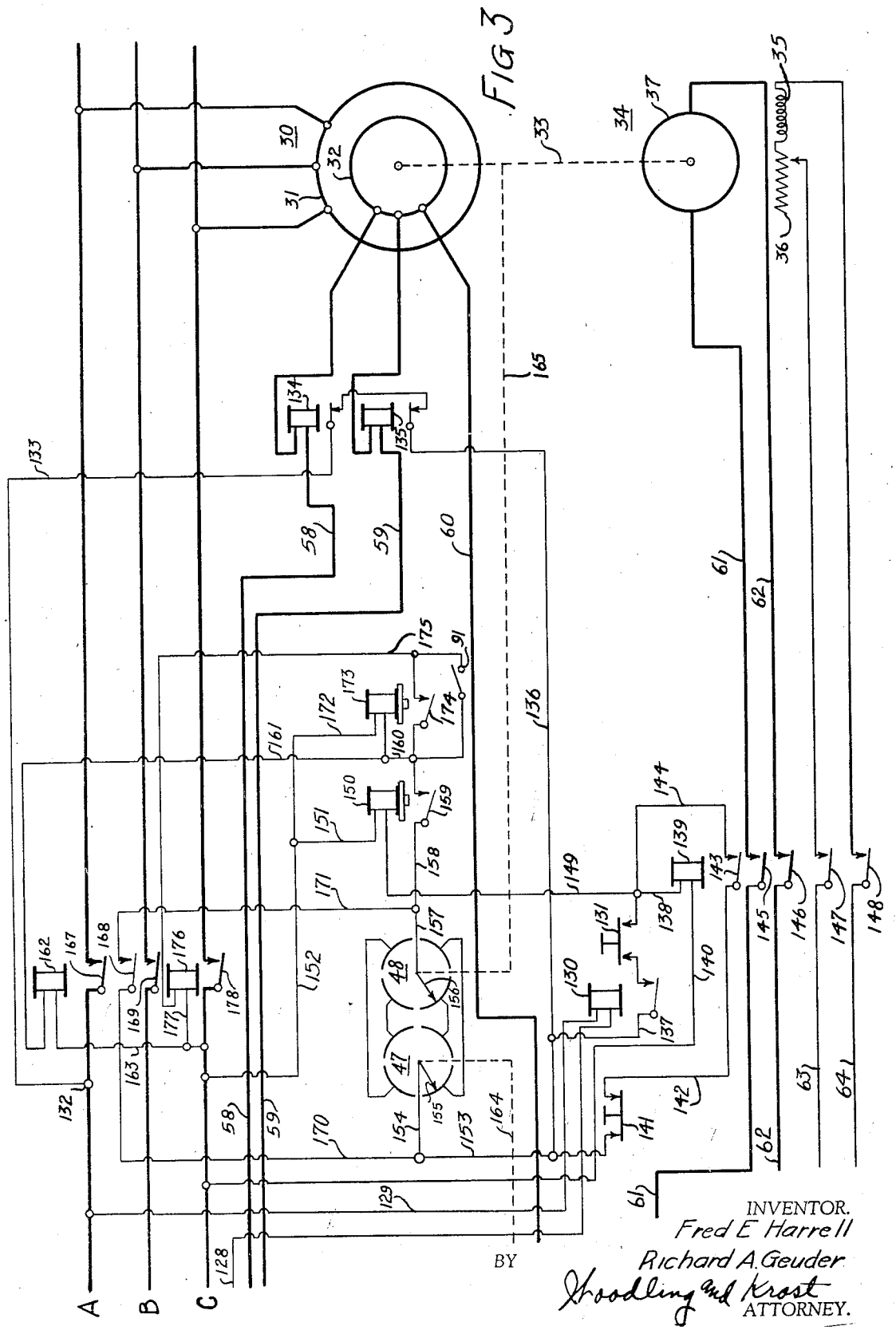

Patented May 28, 1940

2,202,421

UNITED STATES PATENT OFFICE 2,202,421

CONTROL SYSTEM

Fred E. Harrell and Richard A. Geuder, Cleveland, Ohio, assignors to Reliance Electric and Engineering Company, a corporation of Ohio Application November 10, 1938, Serial No. 239,833

23 Claims. (Cl. 172—293)

Our invention relates generally to control systems and more particularly to synchronized control systems.

An object of our invention is to provide for synchronizing a synchronous machine at rest with a synchronous machine in motion.

The term "synchronous machine" as used herein is not limited to the conception of a synchronous motor or generator as conventionally understood, as, for example, a four pole machine excited with 60 cycle current and operating at 1800 R. P. M., but rather a dynamo electric machine having an exciting winding producing a rotating field effect exactly proportional to the frequency of the exciting current and a rotatively mounted secondary winding which when at rest, would have produced in it a rotating field effect, also exactly proportional to the frequency of the primary current, and which is so arranged as to facilitate the bringing out of secondary leads which may be electrically connected to corresponding leads of a like machine.

When two or more such machines are excited from a common source of alternating current, and have their secondary windings electrically connected together, and when the rotatively mounted secondary winding is externally driven, then the externally driven machine becomes a transmitter and the other machines become receivers operating in synchrony.

Another object of our invention is to provide for synchronizing a receiver with a transmitter in motion.

Another object of our invention is to provide for synchronization "on the fly".

Another object of our invention is to provide for stabilizing the speed of a plurality of synchronous machine.

Another object of our invention is to provide for bringing a synchronous receiver at rest up to the approximate speed of a synchronous transmitter in motion by independent means, before synchronously connecting the machines together.

Another object of our invention is to provide for operating a plurality of rotating elements by synchronous machines and by non-synchronous machines, and for causing the non-synchronous machines to bring and stabilize the speed of the synchronous machines close together through the transfer of non-synchronous electrical energy between the non-synchronous machines.

Another object of our invention is to provide for utilizing non-synchronous electrical machines for bringing and stabilizing the speed of synchronous machines close together through the transfer of non-synchronous electrical energy between the non-synchronous machines.

Another object of our invention is to provide for bringing the speed of a synchronous machine from rest to approximately the speed of a synchronous machine in motion by utilizing a non-synchronous machine to drive the synchronous machine which is being synchronized with the synchronous machine already in motion.

Another object of our invention is to provide for insuring the proper indexing of the synchronous machines, before synchronously connecting them together.

Another object of our invention is to provide for insuring that the proper angular relation exists between synchronous machines, before establishing circuits for synchronizing the synchronous machines.

Another object of our invention is to provide for not only synchronizing a receiver with a transmitter "on the fly" but also for synchronizing the receiver and the transmitter in proper angular index relationship to each other.

Other objects and a fuller understanding of our invention may be had by referring to the following description and claims, taken in conjunction with the accompanying drawings, in which:

Figure 1 represents a general diagram illustrating a synchronous control system embodying the features of our invention, and;

Figures 2 and 3 represent a diagrammatical illustration of a synchronous control system embodying the features of our invention, Figures 2 and 3 comprising an electrical circuit shown on the two plates of patent drawings which are arranged to be joined together and interpreted as a single electrical diagram.

With reference to the drawings, our invention comprises, in general, a synchronous transmitter 10 driven by a variable speed prime mover 17, a plurality of synchronous receivers 20, 30, and 40 synchronously connected to the transmitter 10, a plurality of stabilizers 14, 24, 34 and 44 which are arranged to be respectively connected by the shafts 13, 23, 33, and 43, to the transmitter 10 and the receivers 20, 30 and 40, and a plurality of indexing switches 45 and 50, inclusive, which are arranged to insure synchronization of the respective synchronous units in proper angular index with respect to each other.

As shown in Figure 1, the prime mover 17 is arranged to drive a printing machine besides the transmitter 10, the stabilizer 14, and the indexing switches 49, 47, and 45. The synchronous receivers 20, 30 and 40 are arranged to drive respectively an oven No. 1, a coating machine, and an oven No. 2. The stabilizer 24 and the indexing switch 46 are arranged to rotate with the receiver 20; the stabilizer 34, and the indexing switch 48 are arranged to rotate with the receiver 30; and the stabilizer 44 and the indexing switch 50 are arranged to rotate with the receiver 40.

The illustration of the printing machine and the coating machine, together with the ovens is merely typical, and it is clearly understood that our invention is not limited to the processing arrangement illustrated in Figure 1, but may comprise a synchronous arrangement for driving a sectional conveyor or any other arrangement or equipment which is arranged to be driven in synchrony.

The synchronous control circuits in Figure 2 do not illustrate the receiver 40, the stabilizer 44 and the indexing switch 50, but it is manifest that the control circuits comprise the provisions of including not only the additional receiver 40, the stabilizer 44 and the indexing switch 50, but also a plurality of such additional units.

The synchronous transmitter 10 is illustrated as a polyphase unit and comprises a stator or primary winding 11 and a rotor or secondary winding 12 which is driven by the variable speed prime mover 17 through the shaft 13. The receivers 20 and 30 are illustrated as polyphase machines and comprise respectively stators 21 and 31 and rotors 22 and 32. While we have illustrated the synchronous machines 10, 20, and 30 as a polyphase unit, it is to be understood that our invention applies also to single phase synchronous units. The stators or primary windings 11, 21 and 31 are arranged to be energized from a three phase alternating current source indicated by the reference characters A, B, and C. The rotor or secondary winding 22 is arranged to be electrically connected to the rotor or secondary winding 12 through a plurality of conductors 52, 53 and 54. The rotor or secondary winding 32 is arranged to be electrically connected to the rotor or secondary winding 12 through a plurality of conductors 58, 59 and 60. As illustrated, a pair of overload relays 73 and 74 are arranged to protect the synchronous unit 20 against overload, and a pair of relays 134 and 135 are arranged to protect the synchronous unit 30 against overload.

With the transmitter 10 and the receivers 20 and 30 at rest, the customary synchronization may be accomplished, in the polyphase system illustrated, by first supplying single phase power to the respective stators of the synchronous units, followed after a short time interval by supplying three phase power. When synchronization is established, the variable speed prime mover 17 may then be started and the receivers 20 and 30 will follow substantially exactly the angular movements of the transmitter 10.

If, however, the prime mover 17 is in motion before synchronization of the transmitter 10 and the receivers 20 and 30 is affected, the synchronization of the receivers 20 and 30 with the transmitter 10 in motion, presents a variety of problems depending upon the nature of their connected loads. If the connected loads are frictionally connected to the receivers 20 and 30, synchronization may be accomplished should the loads be initially small and gradually increasing frictionally as the speed of the receivers 20 and 30 increase. When the loads are positively connected to the receivers 20 and 30, then the problem of the synchronization of the receivers 20 and 30 with the transmitter 10 already in motion, is a very difficult one. Thus should alternating current be applied to the synchronous transmission system with the transmitter 10 in motion, there is immediately produced a very appreciable torque tending to accelerate the receivers 20 and 30 to the speed of the transmitter 10. The rate of production of this torque is so rapid that the kinetic energy being built up, is of an ever-increasing value that the receivers over-shoot or go to a speed greater than that of the transmitter 10, under which condition, there is a motoring torque produced tending to accelerate the receivers to a still higher speed. The production of the motoring torque causes unstable operation at varying speeds and produces excessive currents in the synchronous transmission system. The same effect is produced if the torque requirements at the receivers exceed the capacity of the receivers. In our invention, we are able to accomplish synchronization of one or more receivers with the transmitter in motion. That is to say, we accomplish synchronization "on the fly". To accomplish synchronization "on the fly", we employ the arrangement of the stabilizers.

The stabilizers may comprise direct current motors, either shunt or compound wound, connected in circuit arrangement with each other. Thus, the field winding 15 of the stabilizer 14, the field winding 25 of the stabilizer 24, and the field winding 35 of the stabilizer 34 are arranged to be energized by direct current through the conductors 63 and 64. The field rheostats 16, 26 and 36 are arranged to vary the direct current excitation respectively of the field winding 15, 25 and 35. The armature 27 of the stabilizer 24 is arranged to be connected in circuit relation with the armature 18 of the stabilizer 14 through the conductor 56 and 57, and the armature 37 of the stabilizer 34 is arranged to be connected in circuit relation with the armature 18 of the stabilizer 14 through the pair of conductors 61 and 62 and the pair of conductors 56 and 57.

In explaining the operation of our control system, let it be assumed that the prime mover 17 is in operation and driving the printing machine together with the transmitter 10, the stabilizer 14 and the indexing switches 49, 47 and 45. To accomplish synchronization of the receiver 20 with the transmitter 10 in motion, it is only necessary for the operator to depress the push-button 70 which establishes a circuit for energizing the relay 79. The circuit for energizing the relay 79 may be traced as follows: Beginning with the connection 71 on the power conductor A, current flows through the conductor 72, the contacts of the overload relay 73 and 74, the conductors 75 and 76, the push-button 70, the conductors 77 and 78, the winding of the relay 79 and the conductor 80 to the connection 81 on the power conductor C. Just as soon as the relay 79 is energized, a holding circuit is established for continuously energizing the relay 79 with the push-button 70 open. The holding circuit may be traced as follows: Beginning with the conductor 65 75, current flows through the conductors 82 and 83, the push-button 84, the conductor 85, the contact 86 of the relay 79, the conductors 87 and 78, the winding of the relay 79 and the conductor 80 to the connection 81 on the power conductor C. The closing of the contacts 88 and 89 of the relay 79 impresses direct current excitation upon the field windings 15 and 25 of the stabilizer 14 and 24 respectively. When direct current excitation is impressed upon the field windings 15 and 25, the stabilizer 14 is caused to act as a generator and the stabilizer 24 is caused to act as a motor. That is to say, the generator 14 produces non-synchronous current to drive electrically the stabilizer 24 as a motor. The stabilizer 24 when acting as a motor drives the rotor 22 of the receiver 20 at a value which approximates the speed of the rotor 12 of the transmitter 10. The relay 79, instead of controlling the establishment of the direct current circuit for impressing direct current excitation upon the field windings 15 and 25, may, as a modification, be arranged to control the establishment of the armature circuit through the conductors 56 and 57, with the field windings permanently excited, or the relay may control the establishment of both the field and the armature circuits.

At the same time, that the push button 70 is depressed, another circuit is established for energizing the slow-acting relay 94. The circuit for energizing the relay 94 may be traced as follows: Beginning with the push-button 70 current flows through the conductors 77 and 93, the winding of the relay 94, and the conductors 94 and 96 to the connection 97 on the power conductor C. Upon the closing of the contact 104 of the relay 94, a circuit is set up through the indexing switches 45 and 46 which, when the indexing switches are of approximately the same angular relation, energizes the relay 107 for impressing single phase excitation upon the stators 11 and 21 of the synchronous units 10 and 20. The purpose of the slow-acting relay 94 is to provide a short-time interval during which the stabilizer 24 may bring the speed of the rotor 22 at rest, up to the approximate speed of the rotor 12 of the synchronous unit 10 in motion.

As diagrammatically shown, the indexing switch 45 may comprise four peripheral segmental contacts and an actuating arm 100 which rotates and makes contact successively with the peripheral segmental contacts. The arm 100 is driven by means of a suitable driving connection 109 from the shaft 13 of the synchronous unit 10. The index 46 may comprise a construction identical to the indexing switch 45 and its rotating arm 101 is driven by means of a suitable driving connection 110 from the shaft 23 of the synchronous unit 20. When the angular position of the rotor 22 is substantially the same as the angular position of the rotor 12, the circuit is established for energizing the relay 107 for impressing single-phase excitation upon the stators 11 and 21 of the synchronous units 10 and 20. The circuit through the index switches 45 and 46 for energizing the relay 107 may be described as follows: Beginning with the conductor 75, current flows through the conductors 82 and 98 and 99, the arm 100 of the indexing switch 45, from there the current flows through any one of the four peripheral contacts to the corresponding peripheral contact of the indexing switch 46, the rotating arm 101, the conductors 102 and 103, the contact 104 of the relay 94, the conductors 105 and 106, the coil of the relay 107 and the conductor 108 to the connection 125 of the power conductor C. The reason that we prefer to use four peripheral segmental contacts instead of a lower number upon the indexing switches 45 and 46 is that should the speed of the rotor 22 driven by the stabilizer 24 be within close range of the speed of the rotor 12 driven by the prime mover 11, then an appreciable length of time might expire before the rotating arm 100 and 101 assume approximately the same angular position. Therefore, in order to reduce the length of time for establishing the circuit through the indexing switches 45 and 46, we preferably use four peripheral segmental contacts. That is to say, if only one peripheral segmental contact were employed the probabilities or chances of establishing a circuit through the index switches would be decreased, resulting in a considerable lapse of time before establishing the circuit for energizing the relay 107 which impresses single-phase excitation upon the stators 11 and 21 of the synchronous unit 10 and 20.

The closing of the contacts 114 and 116 of the relay 107 impresses single-phase excitation upon the stators 11 and 21 and synchronizes the receiver 20 with the transmitter 10. The closing of the contact 115 of the relay 107 establishes a circuit for shunting around the indexing switches 45 and 46. The shunting circuit may be traced as follows: Beginning with the conductor 99 of the indexing switch 45, current flows through the conductor 117, the contact 115, and the conductor 118 to the conductor 102 of the indexing switch 46.

Just as soon as the slow-acting relay 94 is energized, a circuit is established through its contact 104 for energizing the slow-acting relay 120. The circuit for energizing the relay 120 may be traced as follows: Beginning with the contact 104, current flows through the conductors 105 and 119, the winding of the relay 120, and the conductors 121 and 96 to the connection 97 on the power conductor C. The closing of the contact 122 of the slow-acting relay 120 establishes a circuit for energizing the relay 124 which when closed impresses full three-phase excitation upon the stators 11 and 21 of the synchronous units. The circuit through the contact 122 for energizing the relay 124 may be traced as follows: Beginning with the contact 122 current flows through the conductor 123, the winding of the relay 124, which leads to the connection 125 on the power conductors C. The closing of the contact 126 of the relay 124 impresses full three-phase excitation upon the stators of the synchronous units 10 and 20, after which the rotor 22 of the receiver 20 will follow the angular movement of the rotor 12 of the transmitter 10. The purpose of the slow-acting relay 120 is to give a short time interval between the period that single-phase excitation is impressed upon the stators of the synchronous units and the time that three phase excitation is impressed upon the stators of the synchronous units. If the single-phase excitation is insufficient to bring the units into synchronism, three-phase excitation may be initially applied by closing the switch 90 which shunts the contact 122 and causes the relays 107 and 124 to close simultaneously.

Inasmuch as the stabilizer 24 acting as a motor brings the speed of the rotor 22 of the receiver 20 up to the approximate speed of the rotor 12 of the transmitter 10, there is very little tendency for the speed of the rotor 22 to over-shoot when the alternating current is impressed upon the stators of the synchronous units. Therefore, it is manifest that by the combination of the stabilizers 14 and 24 and the indexing switches 45 and 46, we have accomplished synchronization "on the fly" as well as providing proper angular indexing of the receiver 20 with the transmitter 10. If at any period throughout the continuous operation of the receiver 20 and the transmitter 10, should the speed of the synchronous units tend to vary, the stabilizers 14 and 24 function to transmit non-synchronous electrical power between themselves to hold the speed of the rotors 12 and 22 in synchronism. Consequently, the stabilizers 14 and 24 not only function to accomplish synchronization "on the fly" but also operate through the transfer of electrical power to hold the synchronous units 10 and 20 at their synchronous speed.

Just as soon as the relay 124 closes, and completes the synchronization of the receiver 20 with the transmitter 10, a circuit is set up through the closing of the contact 127 for bringing the receiver 30 into synchronism. The circuit may be traced as follows: Beginning with the contact 127, current flows through the conductor 128, through the winding of the relay 130, and the conductor 129 to the power conductor A. The closing of a contact of the relay 130 sets up a circuit, which when the push-button 131 is depressed, brings the synchronous receiver 30 into synchronism with the transmitter 10 in motion. The circuit established by the closing of the relay 130 and the push-button 131 may be described as follows: Beginning with the connection 132 on the power conductor A, current flows through the conductor 133, the contacts of the over-load relays 134 and 135, the conductor 136 and 137, the contact of the relay 130, the push-button 131, the conductor 138, the winding of the relay 139, and the conductor 140 which is connected to the power conductor C.

The closing of the contact 143 establishes a holding circuit for holding the relay 139 closed. The holding circuit may be traced as follows: Beginning with conductor 136, current flows through the push-button 141, the conductor 142, the contact 143, the conductors 144 and 138, the winding of the relay 139, and the conductor 140 which leads to the power conductor C. The closing of the contacts 145 and 146 of the relay 139 connects the armature 37 of the stabilizer 34 to the armature 18 of the stabilizer 14 through the pair of conductors 61 and 62 and the pair of conductors 56 and 57. The closing of the contact 147 and 48 connects the field winding 35 of the stabilizer 34 in circuit relation with the field winding 25 and 15 of the stabilizer 24 and 14, respectively. Therefore, upon the closing of the contacts of the relay 139, the stabilizer 34 is acting as a motor to drive the rotor 32 at approximately the speed of the transmitter 10.

The depressing of the push-button 131 also establishes a circuit for energizing the slow-acting relay 150. The circuit for energizing the relay 150 may be described as follows: Beginning with the push-button 131, current flows through the conductor 149, the winding of the relay 150 and the conductors 151 and 152 to the power conductor C. The closing of the contact 159 of the relay 150 sets up a circuit through the indexing switches 47 and 48 which, when the rotating arms 155 and 156 of the indexing switches are of substantially the same angular position, energizes the relay 162 for impressing single phase excitation upon the receiver 30. The circuit through the indexing switches 47 and 48 for energizing the relay 162 may be traced as follows: Beginning with the conductor 136, the current flows through the conductors 153 and 154, the rotating arm 155 of the indexing switch 47, any one of the four peripheral segmental contacts and from there the current flows through a corresponding peripheral segmental contact on the indexing switch 48, the rotating arm 156, the conductors 157 and 158, the contact 159 of the relay 150, the conductors 160 and 161, the winding of the relay 162, and the conductor 163 to the power conductor C. The construction of the indexing switches 47 and 48 are similar to those described with reference to 46 and 47 indexing switches 45 and 46. The rotating arm 155 may be driven by a drive arrangement 164 in accordance with the speed of the shaft 13 of the transmitter 10. The rotating arm 156 of the indexing switch 47 may be driven by a driving arrangement 165 in accordance with the speed of the shaft 33 of the receiver 30. The closing of the contacts 167 and 169 of the relay 162 impresses single phase excitation upon the stator 31 of the receiver 30 and synchronizes the receiver 30 with the transmitter 10. The object of initially impressing single phase excitation upon the stators is to keep the starting or synchronizing torque of the receivers at a reduced value and thereby minimize the tendency of the rotors speeding up too fast and over-shooting. Other methods might be employed to reduce the value of the starting or synchronizing torque of the receivers, such, for example, as inserting resistance units in the primary windings of the receivers. The closing of the contact 168 establishes a shunting circuit which shunts the indexing switches 47 and 48. The shunting circuit may be traced as follows: Beginning with the conductor 154 of the indexing switch 47, current flows through the conductor 170, the contact 168, and the conductor 171 to the conductor 157 of the indexing switch 48. The purpose of the slow-acting relay 150 is to provide a short period of time in which to allow the stabilizer 34 acting as a motor to bring the speed of the rotor 32 up to the approximate speed of the rotor 12 of the transmitter 10, before impressing single phase excitation upon the stator winding 31.

The closing of the contact 159 of the relay 150 also establishes a circuit for energizing the slow-acting relay 173. The circuit for energizing the relay 173 may be described as follows: Beginning with the contact 159, the current flows through conductor 160, the winding of the relay 173, the conductors 173 and 152 to the power conductor C. The closing of the contact 174 of the relay 173 establishes a circuit for energizing the relay 176, which, when the contact closes, impresses full three phase excitation upon the stator 31 of the receiver 30. The circuit for energizing the relay 176 may be traced as follows: Beginning with the contact 174, the current flows through the conductor 174, the winding of the relay 176, and the conductor 177 to the power conductor C. When full three-phase excitation is impressed upon the stator of the receiver 30, the unit operates in synchrony with the receiver 10 and drives the coating machine. If the speed of the rotors 12 and 32 should vary during operation, then the stabilizers 14 and 34 function to transfer non-synchronous electrical power between themselves to stabilize the synchronous speed of the two units. Therefore, the stabilizer 34 not only functions to bring the speed of the rotor 32 up to the approximate speed of the rotor 12 of the transmitter to permit synchronization "on the fly" but also operates to stabilize the speed of the synchronous receiver 30 by transferring non-synchronous electrical power between the stabilizer 34 and the stabilizer 14. If the single phase excitation is insufficient to bring the unit 30 into synchronism, three phase excitation may be initially applied by closing the switch 91 which shunts the contact 174 and causes the relays 162 and 176 to close simultaneously.

The transmitter 10 and the receivers 20 and 30 may be stopped by depressing the push button 84, and the receiver 30 may be stopped individually by depressing the push-button 141.

In conclusion, it is manifest that we have produced a synchronous control system, which accomplishes synchronization "on the fly" as well as the indexing of the respective synchronous machines with respect to each other. Also our circuits provide for stabilizing the speed of the synchronous units by the transfer of non-synchronous power between stabilizers connected to the synchronous units.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting the primary windings of the transmitter and the receiver to the alternating current supply source, control means for actuating the first and second circuit means, and means for causing the control means to actuate the first circuit means prior to the second circuit means.

2. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting the primary windings of the transmitter and the receiver to the alternating current supply source, and control means for actuating the first and second circuit means, means for causing the control means to actuate the first circuit means prior to the second circuit means, index switch means actuated in accordance with the speed of the transmitter, index switch means actuated in accordance with the speed of the receiver, and circuit connections governed by the index switch means for governing the control means.

3. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting the primary windings of the transmitter and the receiver to the alternating current supply source, and control means for actuating the first and second circuit means.

4. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting a portion of the primary windings of the transmitter and the receiver to a single phase of the alternating current supply source, third circuit means for completing the establishment of circuits to connect the said primary windings to the three phases of the alternating current supply source, and control means for actuating the said circuit means.

5. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting a portion of the primary windings of the transmitter and the receiver to a single phase of the alternating current supply source, third circuit means for completing the establishment of circuits to connect the said primary windings to the three phases of the alternating current supply source, control means for actuating the said circuit means, and means for causing the control means to actuate the first circuit means prior to the second circuit means and the second circuit means prior to the third circuit means.

6. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting a portion of the primary windings of the transmitter and the receiver to a single phase of the alternating current supply source, third circuit means for completing the establishment of circuits to connect the said primary windings to the three phases of the alternating current supply source, control means for actuating the said circuit means, and means for causing the control means to actuate the first circuit means prior to the second circuit means and the second circuit means prior to the third circuit means, index switch means actuated in accordance with the speed of the transmitter, index switch means actuated in accordance with the speed of the receiver, and circuit connections governed by the index switch means for governing the control means.

7. A synchronous transmission system arranged to be energized from an alternating current supply source comprising, in combination, transmitter means having a primary winding and a secondary winding, a plurality of receiver means each having a primary winding and a secondary winding, circuit connections interconnecting the secondary winding of the transmitter with the secondary windings of the receivers, first stabilizing means comprising a dynamo-electric machine having an armature and a field, prime mover means for driving the transmitter means and the armature of the first stabilizer means, a plurality of additional stabilizer means each comprising a dynamo-electric machine having an armature and a field, means for mechanically connecting an additional stabilizer means to each of the receivers, means for connecting the armatures of the stabilizer means in circuit relation with each other, means for energizing the fields of the stabilizer means, and circuit means for connecting the primary winding of the transmitter and the primary windings of the receiver to the alternating current supply source.

8. A synchronous transmission system arranged to be energized from an alternating current supply source comprising, in combination, transmitter means having a primary winding and a secondary winding, a plurality of receiver means each having a primary winding and a secondary winding, circuit connections interconnecting the secondary winding of the transmitter with the secondary windings of the receivers, first stabilizing means comprising a dynamo-electric machine having an armature and a field, prime mover means for driving the transmitter means and the armature of the first stabilizer means, a plurality of additional stabilizer means each comprising a dynamo-electric machine having an armature and a field, means for mechanically connecting an additional stabilizer means to each of the receivers, means for connecting the armature of the stabilizer means in circuit relation with each other, means for energizing the fields of the stabilizer means, and circuit means for connecting the primary winding of the transmitter and the primary windings of the receivers to the alternating current supply source, control means for governing the circuit means, a plurality of index switch means actuated in accordance with the speed of the transmitter, a plurality of additional index switch means each actuated in accordance with the speed of the respective receivers, and circuit connections governed by the index switch means for governing the control means.

9. In combination, a plurality of synchronous units of a synchronous transmission system, stabilizer units comprising dynamo-electric machines electrically connected together and directly connected mechanically to each synchronous unit, and suitable control to permit of the synchronization of any one synchronous unit with the others already in motion, said control including first means for electrically operating the dynamo-electric machines to transfer electrical energy from the dynamo-electric machine in motion to the dynamo-electric machine at rest to bring the speed of the machine at rest close to the speed of the machine in motion and second means for electrically connecting the synchronous unit to be synchronized with the synchronous unit in motion to transfer synchronous electrical energy therebetween.

10. In combination, a plurality of synchronous units of a synchronous transmission system, stabilizer units comprising dynamo-electric machines electrically connected together and directly connected mechanically to each synchronous unit, suitable control to permit of the synchronization of any one synchronous unit with the others already in motion, said control including first means for electrically operating the dynamo-electric machines to transfer electrical energy from the dynamo-electric machine in motion to the dynamo-electric machine at rest to bring the speed of the machine at rest close to the speed of the machine in motion and second means for electrically connecting the synchronous unit to be synchronized with the synchronous unit in motion to transfer synchronous electrical energy therebetween, and third means to index the synchronous units with respect to each other before effecting synchronization.

11. A synchronous transmission system comprising, in combination, transmitter means having rotor and stator elements, receiver means having rotor and stator elements, circuit means for electrically exciting one of said elements of means for driving the synchronous transmitter means and the first stabilizer means, second stabilizer means comprising a non-synchronous dynamo-electric machine mechanically connected to the synchronous receiver means, first circuit means for electrically operating the stabilizer means to transfer non-synchronous electrical energy from the first stabilizer means to bring the speed of the synchronous receiver means close to the speed of the synchronous transmitter means, second circuit means for electrically establishing synchronization of the synchronous receiver means with the synchronous transmitter means, and control means to operate the first circuit means prior to the second circuit means.

19. A synchronous transmission system comprising, in combination, synchronous transmitter means, synchronous receiver means, first stabilizer means comprising a non-synchronous dynamo-electric machine mechanically connected to the synchronous transmitter means, prime mover means for driving the synchronous transmitter means and the first stabilizer means, second stabilizer means comprising a non-synchronous dynamo-electric machine mechanically connected to the synchronous receiver means, first circuit means for electrically operating the stabilizer means to transfer non-synchronous electrical energy from the first stabilizer means to bring the speed of the synchronous receiver means close to the speed of the synchronous transmitter means, second circuit means for electrically establishing synchronization of the synchronous receiver means with the synchronous transmitter means, index means actuated in accordance with the speed of the synchronous transmitter means, index means actuated in accordance with the speed of the synchronous receiver means, and circuit connections governed by the index means for governing the second circuit means.

20. A synchronous transmission system comprising, in combination, synchronous transmitter means, synchronous receiver means, first stabilizer means comprising a non-synchronous dynamo-electric machine mechanically connected to the synchronous transmitter means, prime mover means for driving the synchronous transmitter means and the first stabilizer means, second stabilizer means comprising a non-synchronous dynamo-electric machine mechanically connected to the synchronous receiver means, control means for establishing synchronization of the synchronous receiver means from rest with the synchronous transmitter means already in motion, said control means including means operable before effecting synchronization for electrically operating the stabilizer means to transfer non-synchronous electrical energy from the first stabilizer means to the second stabilizer means to bring the speed of the synchronous receiver means close to the speed of the synchronous transmitter means, said stabilizers operating after synchronization is effected to hold through the transfer of non-synchronous electrical energy from one to the other the speed of the synchronous receiver means at substantially the speed of the synchronous transmitter means, and means for interrupting the control means when the load upon the synchronous receiver means attains a predetermined value.

21. A synchronous transmission system comprising, in combination, three phase synchronous transmitter means, three phase synchronous receiver means, first stabilizer means comprising a non-synchronous dynamo-electric machine mechanically connected to the synchronous transmitter means, prime mover means for driving the synchronous transmitter means and the first stabilizer means, second stabilizer means comprising a non-synchronous dynamo-electric machine mechanically connected to the synchronous receiver means, first circuit means for electrically operating the stabilizer means to transfer non-synchronous electrical energy from the first stabilizer means to the second stabilizer means to bring the speed of the synchronous receiver means close to the speed of the synchronous transmitter means, second circuit means for electrically establishing single phase synchronization of the synchronous receiver means with the synchronous transmitter means, third circuit means to complete three phase synchronization of the synchronous receiver means with the synchronous transmitter means, and control means to operate the first circuit means prior to the second circuit means and the second circuit means prior to the third circuit means.

22. A synchronous transmission system comprising, in combination, transmitter means having rotor and stator elements, receiver means having rotor and stator elements, circuit means for electrically exciting one of said elements of each of said means by current of the same frequency and phase relationship, means for electrically interconnecting the remaining element of each said means, prime mover means for driving the rotor of the transmitter means, synchronization means to establish synchronization of the receiver means with the transmitter in motion, said synchronization means including non-synchronous means mechanically connected to the transmitter means and the receiver means respectively and electrically connected together to bring and stabilize the speed of the receiver means and speed of the transmitter means close together through the transfer of non-synchronous electric energy from one non-synchronous means to the other, and means for operating said circuit means.

23. A synchronous transmission system comprising, in combination, transmitter means having rotor and stator elements, receiver means having rotor and stator elements, circuit means for electrically exciting one of said elements of each of said means by current of the same frequency and phase relationship, means for electrically interconnecting the remaining element of each said means, prime mover means for driving the rotor of the transmitter means, synchronization means including means for operating said circuit means to establish synchronization of the receiver means and the transmitter means, and stabilizer means comprising non-synchronous means mechanically connected to the rotor of the transmitter means and the receiver means and electrically connected together to transfer non-synchronous electrical energy therebetween.

FRED E. HARRELL.
RICHARD A. GEUDER.

each of said means by current of the same frequency and phase relationship, means for electrically interconnecting the remaining element of each said means, prime mover means for driving the rotor of the transmitter means, synchronization means to establish synchronization of the receiver means with the transmitter in motion, said synchronization means including dynamo-electric machines mechanically connected to the transmitter means and the receiver means respectively and electrically connected together to bring and stabilize the speed of the receiver means and speed of the transmitter means close together through the transfer of electric energy from one dynamo-electric machine to the other, and means for operating said circuit means.

12. In combination, a synchronous transmission system including a plurality of synchronous units arranged to be synchronously connected together, stabilizer means comprising non-synchronous machines mechanically connected to the synchronous units and electrically connected together for transferring non-synchronous electrical energy from one stabilizer to the other, control means for establishing synchronization of the synchronous units, and indexing means governed by the synchronous units to govern the control means.

13. A synchronous transmission system arranged to be energized from an alternating current supply source comprising, in combination, transmitter means having a primary winding and a secondary winding, receiver means having a primary winding and a secondary winding, circuit connections interconnecting the said secondary windings, first stabilizer means comprising a dynamo-electric machine having an armature and a field, prime mover means for driving the transmitter means and the armature of the first stabilizer means, second stabilizer means comprising a dynamo-electric machine having an armature and a field, means for mechanically connecting the armature of the second stabilizer means to the receiver, circuit connections interconnecting the said armatures of the stabilizing means, first circuit means for energizing the fields of the stabilizer means, second circuit means for connecting the primary windings of the transmitter and the receiver to the alternating current supply source, control means for actuating the first and second circuit means, and means for reducing the excitation of the primary winding of the receiver to keep the starting or synchronous torque of the receiver at a reduced value and thereby minimize the tendency of the rotor of the receiver speeding up too fast and over-shooting.

14. In combination, a synchronous transmission system including a plurality of synchronous units arranged to be synchronously connected together, stabilizer means comprising non-synchronous machines mechanically connected to the synchronous units and electrically connected together for transferring non-synchronous electrical energy from one stabilizer to the other, control means for establishing synchronization of any one unit with another unit already in motion, said control means including means for electrically operating the non-synchronous machines to transfer non-synchronous electrical energy from the non-synchronous machine in motion to the non-synchronous machine at rest to bring the speed of the machine at rest close to the speed of the machine in motion.

15. In combination, a synchronous transmission system including a plurality of synchronous units arranged to be synchronously connected together, stabilizer means comprising non-synchronous machines mechanically connected to the synchronous units and electrically connected together for transferring non-synchronous electrical energy from one stabilizer to the other, control means for establishing synchronization of any one unit with another unit already in motion, said control means including means for electrically operating the non-synchronous machines to transfer non-synchronous electrical energy from the non-synchronous machine in motion to the non-synchronous machine at rest to bring the speed of the machine at rest close to the speed of the machine in motion, said non-synchronous machines operating after the synchronous units are synchronized to hold the synchronous units at substantially their synchronous speed.

16. A synchronous transmission system comprising, in combination, synchronous transmitter means, synchronous receiver means, first stabilizer means comprising a non-synchronous dynamo-electric machine mechanically connected to the synchronous transmitter means, prime mover means for driving the synchronous transmitter means and the first stabilizer means, second stabilizer means comprising a non-synchronous dynamo-electric machine mechanically connected to the synchronous receiver means, control means for establishing synchronization of the synchronous receiver means from rest with the synchronous transmitter means already in motion, said control means including means operable before effecting synchronization for electrically operating the stabilizer means to transfer non-synchronous electrical energy from the first stabilizer means to the second stabilizer means to bring the speed of the synchronous receiver means close to the speed of the synchronous transmitter means.

17. A synchronous transmission system comprising, in combination, synchronous transmitter means, synchronous receiver means, first stabilizer means comprising a non-synchronous dynamo-electric machine mechanically connected to the synchronous transmitter means, prime mover means for driving the synchronous transmitter means and the first stabilizer means, second stabilizer means comprising a non-synchronous dynamo-electric machine mechanically connected to the synchronous receiver means, control means for establishing synchronization of the synchronous receiver means from rest with the synchronous transmitter means already in motion, said control means including means operable before effecting synchronization for electrically operating the stabilizer means to transfer non-synchronous electrical energy from the first stabilizer means to the second stabilizer means to bring the speed of the synchronous receiver means close to the speed of the synchronous transmitter means, said stabilizers operating after synchronization is effected to hold through the transfer of non-synchronous electrical energy from one to the other the speed of the synchronous receiver means at substantially the speed of the synchronous transmitter means.

18. A synchronous transmission system comprising, in combination, synchronous transmitter means, synchronous receiver means, first stabilizer means comprising a non-synchronous dynamo-electric machine mechanically connected to the synchronous transmitter means, prime mover